June 3, 1958  W. D. MILLER ET AL  2,837,287
THERMOSTATIC CONTROL DEVICE FOR FUEL BURNERS
Filed March 24, 1955
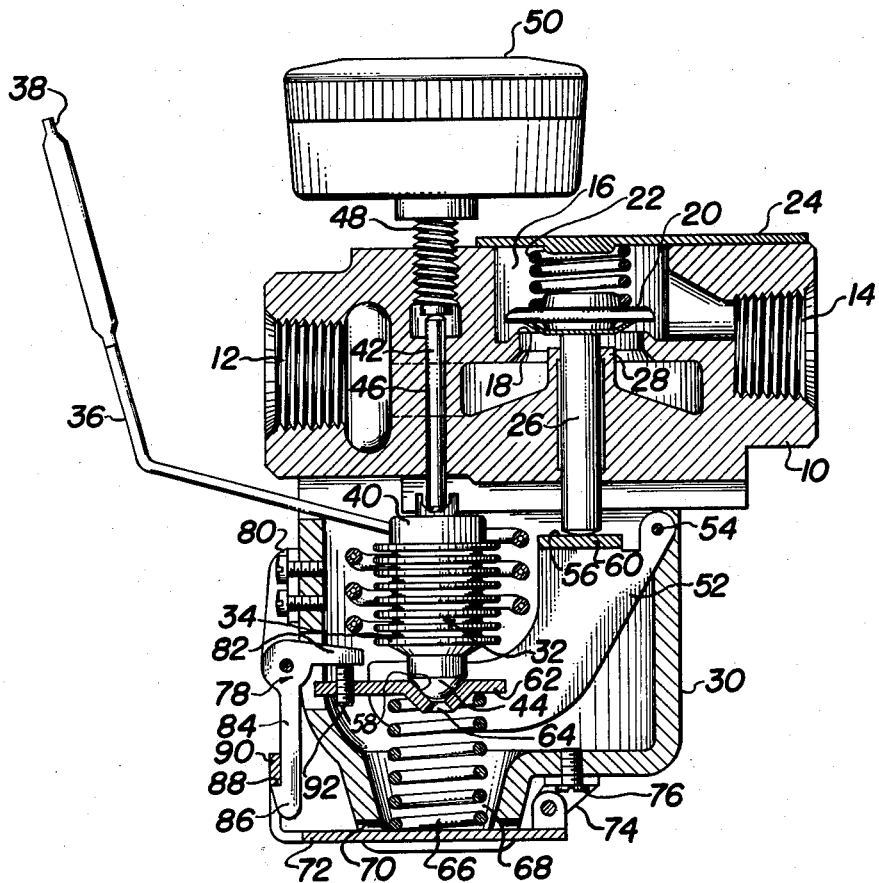
INVENTORS
Woodford D. Miller and
William S. Kunzler
BY
THEIR ATTORNEY.

United States Patent Office 2,837,287
Patented June 3, 1958

2,837,287

THERMOSTATIC CONTROL DEVICE FOR FUEL BURNERS

Woodford D. Miller and William S. Kunzler, Greensburg, Pa., assignors to Robertshaw-Fulton Controls Company, Greensburg, Pa., a corporation of Delaware Application March 24, 1955, Serial No. 496,425

6 Claims. (Cl. 236—99)

This invention relates to thermostatic controls for fuel burners and more particularly to thermally responsive devices for controlling flow of gases or liquid fuel to water heaters and like devices.

Current devices of the indicated type provide fail-safe features to furnish protection in event of abnormal conditions occurring. Such fail-safe features have been incorporated in various ways to automatically actuate valves when an abnormal condition occurs. It has been proposed to incorporate in a thermostatic control device, fail-safe features that will provide for more positive means of control than present devices.

An object of the present invention is to improve such so-called fail-safe devices by insuring more positive operating characteristics.

Another object of the invention is to completely terminate thermostatic control in response to a selected temperature condition.

Another object of the invention is to combine positive thermostatic control with fail-safe features.

In the preferred embodiment of this invention, releasable means is provided to bias a lever into operative engagement with a power element and a valve operating member for transmitting motion therebetween, said biasing means being adapted to be released when an abnormal condition arises to terminate the operative engagement of the lever with the power element and valve operating member thus terminating thermostatic control by the power element.

Other objects and advantages will become apparent from the following description taken in connection with the accompanying drawing which is a longitudinal sectional view of a thermostatic control device embodying this invention.

Referring more particularly to the drawing, the control apparatus is shown as comprising a casing 10 having an inlet passage 12 and an outlet passage 14 for fuel. The inlet passage 12 and outlet passage 14 communicate with a valve chamber 16 provided in the casing 10 and having an annular valve seat 18 carried therein. A valve member 20 is positioned in the valve chamber 16 for reciprocable movement relative to the valve seat 18 between open and closed positions.

The valve member 20 is normally biased toward the valve seat 18 and thus to its closed position by means of a coil spring 22 which is operative between the valve member 20 and a cover plate 24 carried by the casing 10 and forming a closure for the valve chamber 16. A valve stem 26 projects from the valve member 20 and through the valve seat 18 for reciprocable movement in a guide support 28 formed in the casing 10.

The valve stem 26 projects beyond the casing 10 into a housing 30 attached to the casing 10. A power element 32 is located in the housing 30 and is here shown as including an expansible bellows member 34, a capillary tube 36, and a temperature sensing bulb 38. The temperature sensing bulb 38 is adapted to be located in the medium requiring thermostatic control and will cause expansion or contraction of the bellows member 34 in response to changes in temperature which produce changes in the volume of a liquid with which the power element 32 is filled. The bellows member 34 comprises a relatively fixed end 40, adjustable relative to the casing 10 with an adjusting stem 42, and a movable member 44 which is free to move in response to temperature variations.

The adjusting stem 42 extends through a support 46 formed in the casing 10 intermediate the inlet passage 12 and the valve chamber 16, but permitting passage of fuel therebetween. One end of the adjusting stem 42 engages the relatively fixed end 40 of the bellows member 34, the opposite end projecting into engagement with a stud 48 having a portion threaded into the casing 10. Manually operable means in the form of a knob 50, attached to the end of the stud 48, provides for rotation of the stud 48 and thus reciprocable movement of the adjusting stem 42. The bellows member 34 moves in response to movement of the adjusting stem 42 to vary the temperature to be maintained in a manner well known in the art.

A lever 52 underlies the bellows member 34 and is pivoted on the housing 30 by a pin 54. The lever 52 is provided with two engagement surfaces 56 and 58, engageable with the valve stem 26 and the movable member 44 respectively. The engaging surface 56, positioned laterally of the pin 54 to permit positive engagement of the lever 52 with the end of the valve stem 26 which extends into the housing 30, is defined by a portion 60 of the lever 52 which extends perpendicularly from the face of the lever 52. The engaging surface 58 is defined by a portion 62 of the lever 52 which extends perpendicularly from the face of the lever 52 adjacent the free end thereof and underlies the movable member 44. The portion 62 of the lever 52 is provided with a depression 64 to receive the movable member 44 and to define a base for centering a spring 66 which is coaxial with the bellows member 34 and disposed on the opposite side of the lever 52.

In the rear of the housing 30, a recessed portion 68 is provided to prevent lateral movement of the spring 66 with respect to the bellows member 34, without supporting the spring 66 in any manner. The bottom of the recessed portion 68 is provided with a slotted opening 70 to permit movement of the spring 66 to the exterior of the housing 30 should a spring seat, later to be described, be released.

To provide for biasing of the lever 52 into engagement with the movable member 20, a pivotal seat 72 for the spring 66 extends through the slotted opening 70 in the housing 30. A bracket 74 is attached to the exterior of the housing 30 by a screw 76 and provides a pivotal connection between the pivotal seat 72 and the housing 30.

During normal operating conditions, the lever 52 must be biased into engagement with, and follow movements of the movable member 44 as shown. Thermostatic control is thus accomplished by the lever 52 pivoting and causing movement of the valve member 20 in response to movement of the movable member 44 which moves in response to temperature variations. To maintain the lever 52 biased into engagement with the movable member 44, detent means is provided to hold the pivotal seat 72 in its active position as shown.

The detent means comprises a latch 78 which is pivoted on the exterior of the housing 30 by a bracketed pin assembly 80. The latch 78 is constructed in the form of a bell-crank, having a portion 82 extending into the housing for engagement with an abutment means later to be described, and another portion 84 extending along the exterior of the housing 30 to engage the pivotal seat 72. The portion 84 of the latch 78 is provided with a shoulder 86 which engages the edge of a notch 88 on an upturned end portion 90 of the pivotal seat 72. Upon operative engagement of the shoulder 86 with the edge of the notch 88 as shown, the pivotal seat 72 is held in its active position, maintaining the spring 66 in position to bias the lever 52 into engagement with the movable member 44.

During normal operating conditions, the pivotal seat 72 will remain in its latched position as shown, maintaining the bias of the spring 66 and causing the lever 52 to follow the movable member 44, thus effecting thermostatic control. However, if an abnormal condition, such as a fluid loss by the power element 32 or an abnormal temperature condition should arise, it is desired to completely terminate thermostatic control and thus provide an additional safety feature. Termination of thermostatic control is accomplished by terminating the operative engagement of the lever 52 with the movable member 44. Hence, means is provided to release the pivotal seat 72 from its active position and release the biasing force of the spring 66.

To release the pivotal seat 72 from its active position, means is provided for pivoting the latch 78 counterclockwise to withdraw the shoulder 86 from the notch 88 on the upturned portion 90 of the pivotal seat 72. Abutment means comprising a screw 92, threaded through the portion 62 of the lever 52, is provided to engage the portion 82 of the latch 78 extending into the housing 30. Upon excessive clockwise movement of the lever 52 caused by excessive contraction of the bellows member 34 and biasing force of the spring 66, the screw 92 will engage the portion 82 of the latch 78 causing the latch 78 to pivot in a counterclockwise direction releasing the pivotal seat 72. The degree of contraction of the bellows member 34 necessary to release the pivotal seat 72, may be varied by adjusting the screw 92 to vary the movement by the movable member 44, necessary to cause engagement of the latch 78 by the screw 76.

Operation

In the operation of the device described, the latched position of the pivotal seat 72, as shown in the drawing, is its normal operating position. Should the temperature sensed by the temperature sensing bulb 38 increase, the bellows member 34 will expand causing movement of its movable member 44 toward the rear of the housing 30. Since the lever 52 is biased by the spring 66 into operative engagement with the movable member 44, the lever 52 will be caused to pivot on the pin 54 in a counterclockwise direction. Likewise, the engaging surface 56 of the lever 52, forming an operative connection with the valve stem 26, pivots in a counterclockwise direction permitting the valve stem 26 to move toward the rear of the casing 10. This movement of the valve stem 26 allows the valve member 20 to move toward a closed position, restricting the fuel flow through the valve chamber 16. The temperature at which complete closure of the valve member 20 occurs can be regulated by the knob 50, which when rotated moves the fixed end 40 of the bellows member 34 and concurrently varies the position of the valve member 20 with respect to the valve seat 18.

Should the temperature sensed by the temperature sensing bulb 38 decrease, contraction of the bellows member 34 will occur resulting in a clockwise pivoting motion of the lever 52 about the pin 54. In this case, the valve member 20 is moved a greater distance from the valve seat 18 by the lever 52, allowing increased fuel flow through the valve chamber 16.

As continued contraction of the bellows member 34 ensues, the screw 92 will move into engagement with the interior portion 82 of the latch 78. Further movement of the lever 52 will force the screw 92 to pivot the latch 78 in a counterclockwise direction, resulting in release of the pivotal seat 72 from its active position. Release of the pivotal seat 72 removes the bias of the spring 66 between the lever 52 and the movable member 44 and terminates the operative connection therebetween. With the operative connection between the lever 52 and the movable member 44 terminated, the lever 52 no longer controls the movement of the valve member 20 which is then moved to its fully closed position by the spring 22.

The described closing operation permits positive, snap-acting closing of the valve member 20 in event of an excessive temperature decrease and will have advantages in various applications of this invention.

The principal safety feature provided for in the device described herein is its response to loss of fluid by the power element 32. Should a fluid loss occur, the bellows member 34 will collapse resulting in excessive clockwise movement of the lever 52 and release of the pivotal seat 72. This operation will not be discussed in detail since it is essentially the same as that for a decreasing temperature condition as described above.

It will be apparent from the foregoing that the illustrated embodiment of the invention provides improved fail-safe thermostatic control features and accordingly accomplishes the objects of the invention. On the other hand, it will be obvious to those skilled in the art that the illustrated embodiment may be variously changed and modified or features thereof, singly or collectively embodied in other combinations than that illustrated without departing from the spirit of the invention or sacrificing all the advantages thereof, and that accordingly the disclosure herein is illustrative only and the invention is not limited thereto.

It is claimed and desired to secure by Letters Patent:

1. A thermostatic control apparatus comprising a casing having inlet and outlet openings for fuel, a valve seat intermediate said openings, a valve member reciprocable relative to said seat between open and closed positions and being biased to said closed position, a valve stem carried by said valve member and projecting toward said seat, a pivoted lever engaging said valve stem, a spring seat pivoted on said casing, means for latching said spring seat in a predetermined position, an expansible bellows member within said casing, a spring engaging said spring seat for biasing said lever into engagement with said bellows member, a temperature sensing bulb, a capillary tube connecting said bellows and bulb in a closed system, a fluid under pressure filling said system for causing expansion or contraction of said bellows member upon variation in temperature of said fluid, a releasing mechanism for releasing said latching means in response to excessive contraction of said bellows, release of said latching means permitting pivotal movement of said spring seat to thereby remove the bias of said spring from said lever to permit said valve member to move to said closed position.

2. A thermostatic control device comprising a casing having inlet and outlet passages separated by a valve seat, a valve member movable relative to the seat for controlling a fluid flow between said passages, resilient means for biasing said valve member toward the seat, means normally defining an operative connection for transmitting movement to said valve member, biasing means engaging said operable connection and having an active position for urging the same in one direction, thermally responsive means including a movable member engaging said operable connection for moving the same in another direction, and means responsive to excessive movement of said movable member for terminating said operative connection to permit movement of said valve member toward the seat under the bias of said resilient means.

3. A thermostatic control device comprising a casing having inlet and outlet passages separated by a valve seat, a valve member movable relative to the seat for controlling a fluid flow between said passages, resilient means for biasing said valve member toward the seat, a valve operating member forming an operative connection for transmitting movement to said valve member, biasing means having active and inactive positions and engaging the operative connection for urging the same in one direction, thermally responsive means including a movable member engaging the operative connection for moving the same in another direction, detent means associated with the operative connection for normally maintaining said biasing means in its active position, and means responsive to excessive movement of said movable member for actuating said detent means to release said biasing means to its inactive position whereby the operative connection is terminated and said valve member is free to move under the bias of said resilient means toward said seat.

4. A thermostatic control device as claimed in claim 3 wherein said biasing means includes a spring and a movable seat for said spring, said spring seat being cooperable with said detent means to be latched in a first position wherein said spring is retained in its active position and to be released to a second position wherein said spring is moved to its inactive position.

5. A thermostatic control device comprising a casing having inlet and outlet passages separated by a valve seat, a valve member movable relative to said seat for controlling a fluid flow between said passages, resilient means for biasing said valve member toward said seat, thermally responsive means including a movable member operable in response to a change in a temperature condition, spring means having active and inactive positions and being biased in said casing to act in opposition to the movable member of said thermally responsive means, lever means normally forming an operative connection between said spring means and said movable member for transmitting movement to said valve member, a movable support for said spring means, detent means associated with said operative connection and said movable support for normally maintaining said spring means in said active position, and means responsive to excessive movement of said movable member for actuating said detent means to release said movable support in order to permit movement of said spring means to said inactive position wherein said valve member is free to move under the bias of said resilient means toward said seat.

6. A thermostatic control apparatus comprising a casing having inlet and outlet passages separated by a valve seat, a valve member movable relative to said seat for controlling a fluid flow between said passages, resilient means for biasing said valve member in one direction relative to said seat, thermally responsive means including a movable member operable in response to a change in a temperature condition, a coil spring having active and inactive positions and being biased to act in opposition to the movable member of said thermally responsive means, a supporting seat for said coil spring being movable to place the same in its active and inactive positions, a valve operating member normally forming an operative connection between said movable member and said coil spring to transmit movement to said valve member, detent means associated with said operative connection and said support seat for normally maintaining said coil spring in said active position, and means responsive to excessive movement of said movable member for actuating said detent means to move said supporting seat in order to release said coil spring to said inactive position thereby terminating said operative connection to permit movement of said valve member under the bias of said resilient means.

References Cited in the file of this patent

UNITED STATES PATENTS

| 2,245,773 | Grant | June 7, 1941 |
| 2,387,792 | Holmes | Oct. 30, 1945 |
| 2,419,980 | Worth | May 6, 1947 |
| 2,422,924 | Puster | June 24, 1947 |